(12) United States Patent
Yoshikawa et al.

(10) Patent No.: US 7,421,335 B2
(45) Date of Patent: Sep. 2, 2008

(54) NAVIGATION SYSTEM AND METHOD

(75) Inventors: Kazutaka Yoshikawa, Okazaki (JP); Kenji Nagase, Okazaki (JP); Masao Kawai, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 710 days.

(21) Appl. No.: 10/979,123

(22) Filed: Nov. 3, 2004

(65) Prior Publication Data

US 2005/0143905 A1    Jun. 30, 2005

(30) Foreign Application Priority Data

Dec. 24, 2003  (JP)  ............... 2003-426120

(51) Int. Cl.
*G01C 21/34* (2006.01)
*G08G 1/00* (2006.01)
*G00F 19/00* (2006.01)

(52) U.S. Cl. .............. 701/200; 701/117; 701/204; 340/995.13

(58) Field of Classification Search .......... 701/200, 701/201, 117, 119, 35, 202, 204; 340/995.13, 340/905; 455/456.1, 441, 466, 404.02
See application file for complete search history.

(56) References Cited

U.S. PATENT DOCUMENTS

| | | | |
|---|---|---|---|
| 6,236,933 B1 * | 5/2001 | Lang | ............. 701/117 |
| 6,253,146 B1 | 6/2001 | Hanson et al. | |
| 6,823,263 B1 * | 11/2004 | Kelly et al. | ............. 702/3 |
| 6,882,930 B2 * | 4/2005 | Trayford et al. | ............. 701/117 |
| 2001/0001848 A1 | 5/2001 | Oshizawa et al. | |
| 2002/0161517 A1 * | 10/2002 | Yano et al. | ............. 701/209 |
| 2005/0288046 A1 * | 12/2005 | Zhao et al. | ............. 455/466 |

FOREIGN PATENT DOCUMENTS

| | | |
|---|---|---|
| DE | 101 10 550 A1 | 9/2002 |
| EP | 0 987 664 A | 3/2000 |
| FR | 2 817 071 A | 5/2002 |
| JP | A-08-271277 | 10/1996 |
| JP | A-09-134496 | 5/1997 |
| JP | A 09-274697 | 10/1997 |
| JP | A-10-160496 | 6/1998 |
| JP | A-2000-028376 | 1/2000 |
| JP | A-2000-266562 | 9/2000 |
| JP | A-2001-296133 | 10/2001 |
| JP | A-2002-181179 | 6/2002 |
| JP | A-2002-333335 | 11/2002 |
| JP | A-2003-246270 | 9/2003 |

* cited by examiner

*Primary Examiner*—Tan Q Nguyen
(74) *Attorney, Agent, or Firm*—Oliff & Berridge, PLC (57) ABSTRACT

A navigation system collects life information associated with a user and extracts a life pattern from the collected life information. The navigation system registers the extracted life pattern as life pattern information. The navigation system determines a predicted start time and a predicted destination based on the life pattern information and generates predicted traffic information associated with a geographical area including the destination and associated with a time range including the predicted start time.

19 Claims, 7 Drawing Sheets

NAVIGATION SYSTEM AND METHOD

INCORPORATION BY REFERENCE

The disclosure of Japanese Patent Application No. 2003-426120 filed Dec. 24, 2003 including the specification, drawings, and claims is incorporated herein by reference in its entirety.

BACKGROUND OF THE INVENTION

1. Field of Invention

The present invention relates to a navigation system.

2. Description of Related Art

In a conventional navigation apparatus for use in a vehicle such as a car, an optimum route from a specified start point to a specified destination is searched for on the basis of road map data. As a result of the search, a detected route is displayed on display means. During the route search, a searching condition is set such that a route with a shortest distance from the specified start point to the specified destination or a route with a shortest driving time is detected.

A conventional system is known that transmits road traffic information to a navigation apparatus installed in a vehicle such that a user (such as a driver) of the vehicle can select a route to avoid traffic congestion indicated by the received road traffic information. For example, in a system called VICS® (Vehicle Information & Communication System), road traffic information indicating congestion on roads or traffic restrictions is produced based on information collected from a traffic control system managed by the police, Japan Highway Public Corporation, or the like. The road traffic information is transmitted to navigation apparatuses via communication means. If a navigation apparatus receives the road traffic information, that navigation apparatus displays congested sections of roads on a map in accordance with the received road traffic information. A conventional information center is also known which processes road traffic information and transmits selected pieces of road traffic information from a server of the information center to navigation apparatuses via communication means such as a portable telephone (a specific description thereof may be found, for example, in Japanese Unexamined Patent Application Publication No. 9-274697).

However, in the conventional systems described above, communication between a navigation apparatus and a server only starts after the navigation apparatus is turned on. Therefore, data is not received from the server and is not displayed on a display means to a user until the navigation apparatus is turned on. Thus, when a user in a vehicle wants to check or use traffic information received from the server before the user starts to drive the vehicle, the user has to wait for traffic information to arrive.

When a user wants to acquire, from a server, road traffic information associated with a route from a current position to a specified destination, the user cannot get or use the road traffic information until the user inputs the destination in the navigation apparatus. Thus, the user has to perform a troublesome operation, which requires additional operation time.

SUMMARY OF THE INVENTION

Thus, various exemplary embodiments of this invention provide a navigation system including a controller that collects life information associated with a user and extracts a life pattern from the collected life information. The controller registers the extracted life pattern as life pattern information. The controller determines a predicted start time and a predicted destination based on the life pattern information and generates predicted traffic information associated with a geographical area including the destination and associated with a time range including the predicted start time.

Various exemplary embodiments of the invention provide a method for providing information including collecting life information associated with a user; extracting a life pattern from the collected life information; registering the extracted life pattern as life pattern information; determining a predicted start time and a predicted destination based on the life pattern information; and generating predicted traffic information associated with a geographical area including the destination and associated with a time range including the predicted start time.

Accordingly, various exemplary embodiments of the invention allow a user of a navigation system to use predicted traffic information substantially immediately after a user turns on the navigation device.

BRIEF DESCRIPTION OF THE DRAWINGS

Exemplary embodiments of the invention will now be described with reference to the accompanying drawings, wherein.

DETAILED DESCRIPTION OF EXEMPLARY EMBODIMENTS

Figure 1:
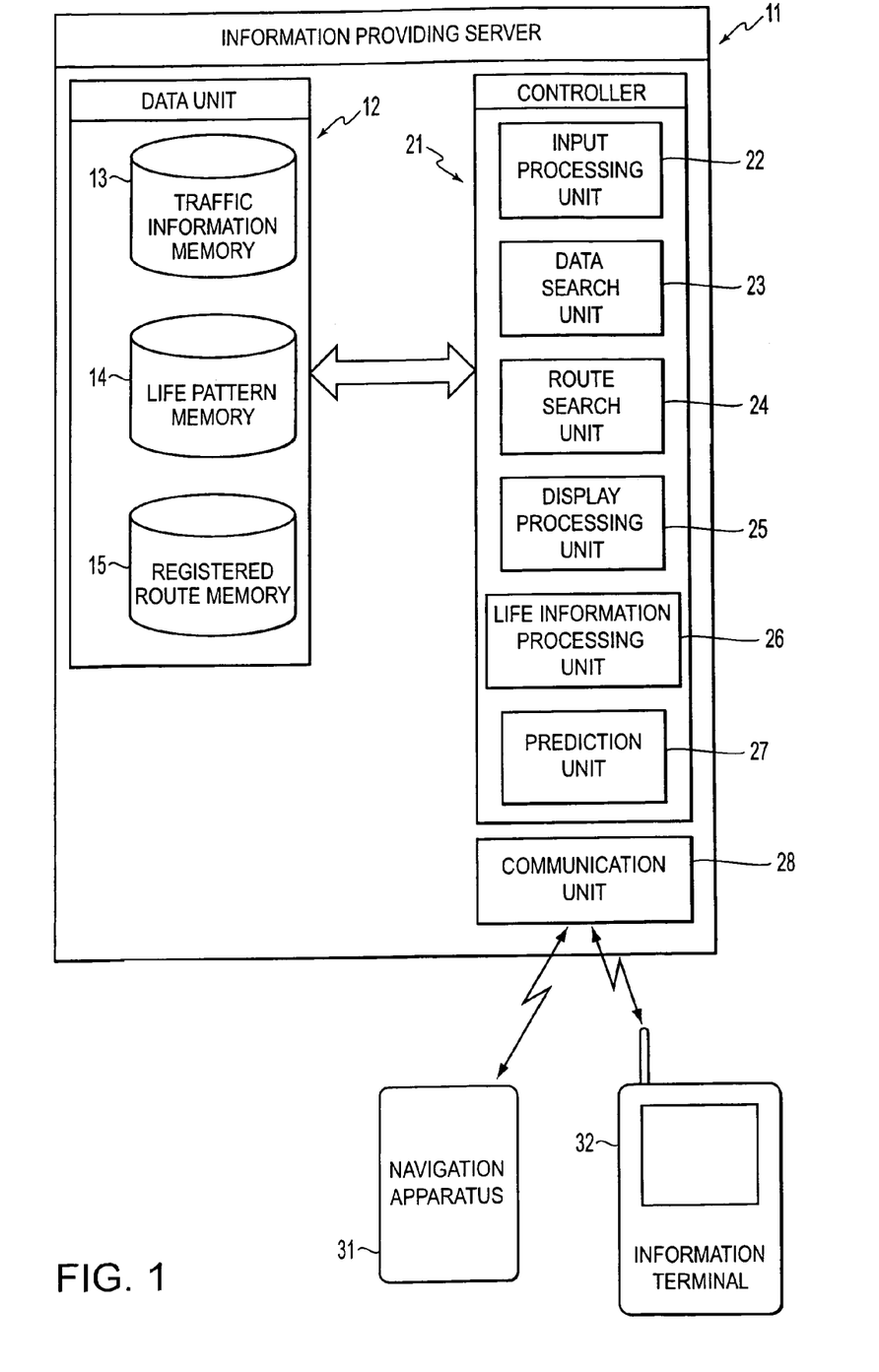
FIG. 1 is a conceptual diagram of a navigation apparatus according to an exemplary embodiment of the invention.

FIG. 1 is a conceptual diagram of a navigation apparatus according to an exemplary embodiment of the invention. FIG. 1 shows an information providing server 11 implemented, for example, in a computer that may include a controller such as, for example, a CPU or an MPU, storage means such as a semiconductor memory, a magnetic disk, or an optical disk, and a communication interface. The computer does not necessarily need to be a single computer. The computer may be a distributed server including a plurality of computers. The computer may also include one or more other systems constructed therein. The information providing server 11 may also include systems constructed in another computer.

FIG. 1 also shows a navigation apparatus 31 that may be used by a user. For ease of explanation, only one navigation apparatus 31 is described. However, according to this exemplary embodiment, there can be a plurality of navigation apparatuses. The user may be, for example, a driver or a passenger of a vehicle such as a car, a truck, a bus, or a motorcycle.

The navigation apparatus 31 can include a controller, such as, for example, a CPU or an MPU, a storage device such as a semiconductor memory, a magnetic disk, an optical disk, a display such as a liquid crystal display, an LED (Light Emitting Diode) display, or a CRT, an input device such as a keyboard, a joystick, arrow keys, a push button, a remote controller, or a touch panel, a display controller for controlling the display, and a transmitting/receiving unit such as a communication interface. The navigation apparatus 31 may have the capability of detecting the current detection using a GPS (Global Positioning System), a geomagnetic field sensor, a distance sensor, a steering sensor, a beacon sensor, a gyroscopic sensor, or the like. Furthermore, the navigation apparatus 31 may also have the capability of searching for a route to a specified destination and the capability of providing route navigation/guidance along a detected route.

The transmitting/receiving unit may be a wireless communication device for use by the navigation apparatus 31. A specific example of the transmitting/receiving unit is a wireless LAN (Local Area Network) device such as a wireless LAN card. The wireless communication device for use by the navigation apparatus 31 may be preinstalled in or attached to the navigation apparatus 31. Although the structure of the vehicle is not shown in the figures, electric power may be supplied from a vehicle battery serving as a main power supply (not shown) to the navigation apparatus 31. The vehicle can include an accessory signal generator. In response to receiving an accessory signal from the accessory signal generator, the entire navigation apparatus 31 may be activated. The navigation apparatus 31 may also be activated when the wireless LAN device serving as the transmitting/receiving unit receives a start signal from the outside. In this case, in order to minimize the power consumption, it may be desirable to activate only a part of the navigation apparatus 31 necessary for receiving data.

Herein it is assumed that, during the night hours, the vehicle is generally parked at or near a home of a user (such as a driver, a passenger, or an owner of the vehicle). In the user's home a wireless communication device serving as an access point for communication with, for example, the wireless LAN device of the navigation apparatus 31 via a wireless LAN system if disposed.

Specifically, for example, a wireless LAN adapter or the like is used as the access point, and communication with the navigation apparatus 31 via the wireless LAN system can be performed, for example, using a radiowave in a 2.4-GHz ISM band, a 5.2-GHz band, or a 19-GHz submillimeter band, or using an infrared ray. As for the wireless LAN system, for example, a system according to the standard of IEEE802.11 a, IEEE802.11b, IEEE802.11e, or IEEE802.11g, or a Bluetooth system designed for use as a domestic wireless communication system may be employed. The access point may be, for example, a router or a home server with storage means designed to be used in a domestic network or LAN. It is further assumed that the user's parking place is located within an area where communication with the access point is possible.

Note that the access point does not necessarily need to be located in the user's home, but the access point may be located at a place such as a Hot Spot (registered trademark) that can be used by a plurality of users.

The access point can communicate with the information providing server 11 via a network (not shown). The network may be the Internet, although it is not limited to the Internet. Instead of the Internet, any type of communication network such, for example, as a wired or wireless public communication network, a private communication network, an intranet, a LAN, a WAN (Wide Area Network), a portable telephone network, or a PHS (Personal Handy-phone System) network may be used, or any combination of two or more communication networks may be used. Use of the network allows the navigation apparatus 31 to communicate with the information providing server 11 via the access point. It is assumed that each navigation apparatus 31 is registered in the information providing server 11 and is assigned an ID key identifying the navigation apparatus 31.

FIG. 1 shows an information terminal 32 used by the user. The information terminal 32 may be a type of computer including a controller, such as, for example, a CPU or an MPU, storage means such as a semiconductor memory or a magnetic disk, a display such as a CRT, a liquid crystal display, or an LED display, an input device such as a keyboard, joystick, a touch panel, a tablet, a push button, a rotating dial, or a remote controller, and an input/output interface. The information terminal 32 may be a portable telephone, although the information terminal 32 is not limited to the portable telephone. Instead of the portable telephone, any type of information terminal such as a personal computer, a PHS telephone, a desktop telephone, a PDA (Personal Digital Assistant) device, an electronic notepad, a portable information terminal, a game machine, or a digital television set may also be used. Although according to this exemplary embodiment there can be a great number of information terminals, only one information terminal 32 is described for ease of explanation. The information terminal 32 can also be capable of communicating with the information providing server 11 via the network. It is assumed that each information terminal 32 is registered in the information providing server 11 and is assigned an ID key identifying the information terminal 32.

The information providing server 11 may be described in terms of functional units such as a data unit 12 for storing data necessary to provide predicted congestion information, a controller 21 for acquiring data from the data unit 12 and predicting an occurrence of congestion, and a communication unit 28 for communicating with the navigation apparatus 31 and/or the information terminal 32. The data unit 12 may include a traffic information memory 13 in which traffic information data may be stored, a life pattern memory 14 in which life pattern data is stored, and a registered route memory 15 in which information associated with registered routes is stored.

The traffic information memory 13 (e.g., a database) may store road traffic information indicating congestion on roads or traffic restrictions, which may be produced by a traffic information/communication system such as VICS®. Information associated with congestion that occurred in the past on roads may also be stored in the traffic information memory 13 in the form of statistical congestion information. The traffic information memory 13 may store event information, statistical congestion information, and/or weather information.

For example, event information may indicate places and dates/times of events such as a festival, a parade, a fireworks display, and so on. The statistical congestion information, for example, may indicate that congestion tends to occur on roads near a train station or a large commercial establishment during a particular time period every weekday. The statistical congestion information may also indicate that congestion tends to occur on roads near a swimming beach during a summer holiday season.

The traffic information memory 13 may store information provided by a large number of registered users. Specific examples of such information may include detailed road congestion information indicating congestion on a particular road, detailed traffic regulation information indicating traffic regulations enforced by the police, and detailed road traffic information indicating a traffic restriction due to a road/building construction. In the case of road congestion information, it may include information indicating the physical length of congestion, the cause of congestion, and/or a predicted time at which congestion will end. In the case of traffic regulation information, it may include information indicating the type of regulation such as a regulation in terms of vehicle speed or parking, the place where the regulation is enforced, and/or the day of week and the time when the regulation is enforced. In the case of traffic restrictions, it may include information indicating the period during which a road/building construction is performed, the type of traffic restriction such as closing, a restriction to one way traffic whose direction is alternately changed, or a restriction on lanes, and/or the time zone in which the traffic restriction is imposed.

The life pattern memory 14 (e.g., a database) stores life pattern data produced by extracting life patterns from daily driving data and/or life information associated with the user, such as schedule information, received from the navigation apparatus 31 or the information terminal 32 of the user.

The registered route memory 15 (e.g., a database) stores data indicating daily-used routes, such as a route from the user's home to the user's place of work or the user's school, and scheduled and registered routes such as a route from the user's home to a sightseeing spot, extracted from the daily driving data and/or schedule information received from the navigation apparatus 31 or the information terminal 32.

The controller 21 may be functionally divided into an input processing unit 22, a data search unit 23, a route search unit 24, a display processing unit 25, a life information processing unit 26, and a prediction unit 27. The input processing unit 22 may perform various processes, for example, producing road traffic information indicating congestion on roads from information collected from a traffic control system managed by the police, Japan Highway Public Corporation, and storing the resultant road traffic information into the traffic information memory 13. The input processing unit 23 may collect, for example, road traffic information, statistical congestion information, for example, and store the collected information into the traffic information memory 13. The input processing unit 23 may collect, for example, life information associated with the user, and collect data associated with registered routes and store the collected data into the registered route memory 15.

The data search unit 23 can access a POI (Point of Interest) memory that will be described later and can search for coordinates of a point where a facility is located and/or can search for a name or address of that facility. The route search unit 24 can search for a route to a destination by, for example, taking into account predicted traffic information. The display processing unit 25 can, for example, display the detected information associated with the point of the facility, the detected route, and/or the predicted congestion information on the display of the navigation apparatus 31.

The life information processing unit 26 can extract a life pattern from the life information and can register the extracted life pattern. The extracted life pattern may be stored, for example, in the life pattern memory 14. The prediction unit 27 can determine, for example, a predicted start time and a predicted destination on the basis of the life pattern information and can produce predicted congestion information indicating traffic congestion that is predicted to occur in a geographical area including the predicted destination within a time period including the predicted start time.

The communication unit 28 can communicate with, for example, the navigation apparatus 31 and can receive driving data from the navigation apparatus 31. The communication unit 28 can also transmit a start command to the navigation apparatus 31 thereby activating the navigation apparatus 31. After the navigation apparatus 31 is activated by the start command, the communication unit 28 can further transmit, for example, predicted congestion information. Note that the predicted congestion information may be transmitted to the navigation apparatus 31 after the predicted congestion information is displayed by the display processing unit 25. The communication unit 28 can acquire information such as, for example, schedule information (including, for example, when the user wakes up), and/or the like by communicating with, for example, the navigation apparatus 31, the information terminal 32, and/or the personal computer or the home server connected to the access point. After the predicted congestion information is displayed by the display processing unit 25, the predicted congestion information may be transmitted to the information terminal 32.

In addition to the capability of producing predicted congestion information, the information providing server 11 has other capabilities such as, for example, the capability of searching for a route and the capability of searching for points or facilities. Those capabilities make it possible to, in response to a request from the navigation apparatus 31, search for a route from a specified start point or a current position to a destination and transmit, for example, information associated with a detected route together with map information. Also in response to a request from the navigation apparatus 31, the service may search for a facility such as, for example, a restaurant and transmit information associated with a detected facility.

By communicating with the server 11, it is possible for the navigation apparatus 31 to display information about a route detected based on newest information, facility information, and/or map information on the display of the navigation apparatus 31. This may be done simply by transmitting a request signal from the navigation apparatus 31 to the information providing server 11. Therefore it is possible to search the newest information even when the navigation apparatus 31 does not have a high-performance route/data searching function or the navigation apparatus 31 does not have the newest map information.

It is also possible to acquire, for example, route information, facility information, map information, or the like and display the acquired information on the display of the information terminal 32, by, for example, transmitting a request signal to the information providing server 11 from the information terminal 32.

Preferably, the information providing server 11 can include a terminal identification unit (not shown) for identifying the navigation apparatus 31 and the information terminal 32 on basis of, for example, their ID key or the like. The information providing server 11 can also include, for example, a map memory in which map information is stored, a POI memory, and a road memory, although they are not shown in the figures. The map memory may store map information including, for example, data indicating nodes, links, coordinates, facility names, and/or the like necessary to draw a map. The POI memory may store, for example, facility data, town page data, event data, and/or the like necessary to search for, for example, a start point, a destination, a passing point, and/or the like. The POI memory may further include, for example, detailed information of facilities and/or areas. The road memory may store data indicating, for example, search costs of roads, types of road, and/or the like necessary to, for example, search for a route.

Figure 2:
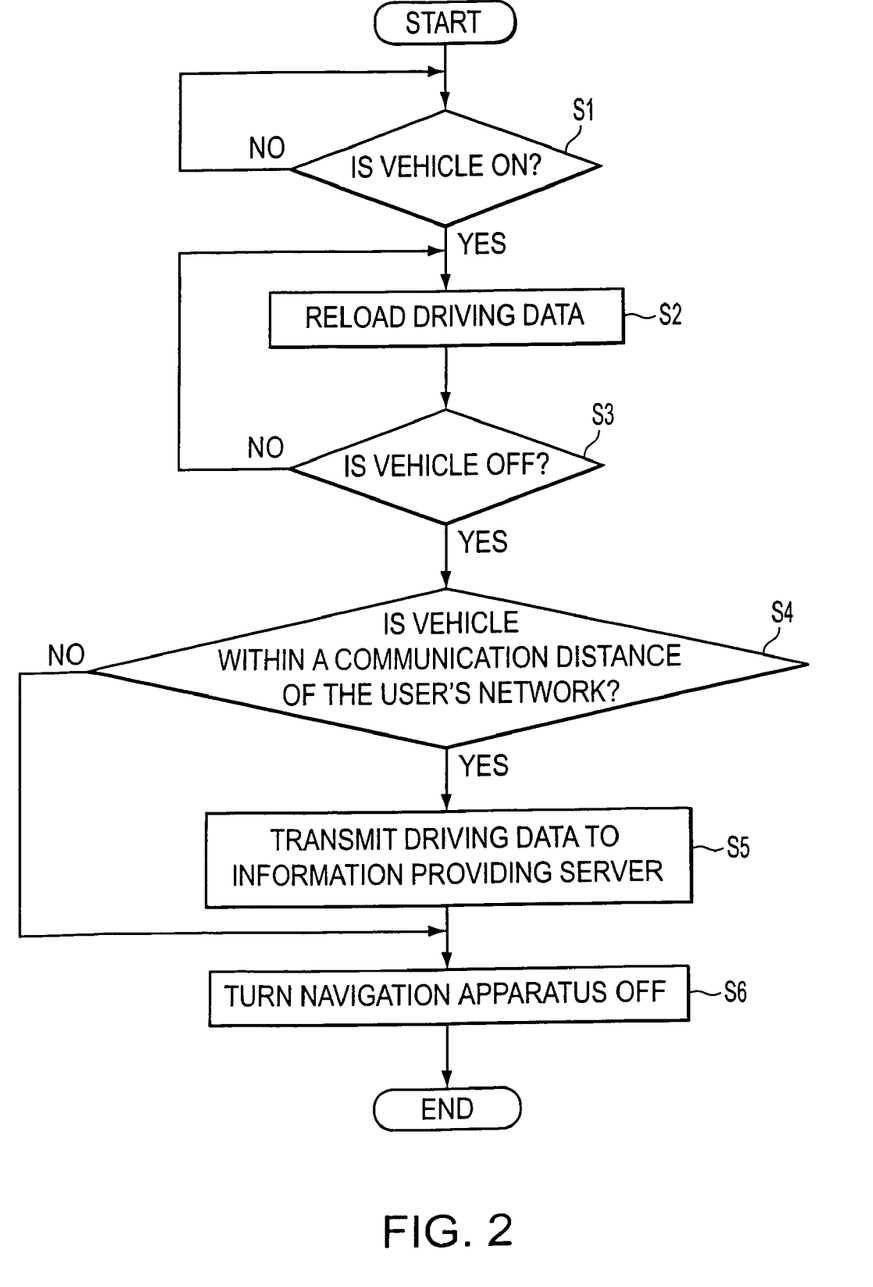
FIG. 2 is a first flow chart showing a process of uploading life information according to an exemplary embodiment of the invention.
Figure 3:
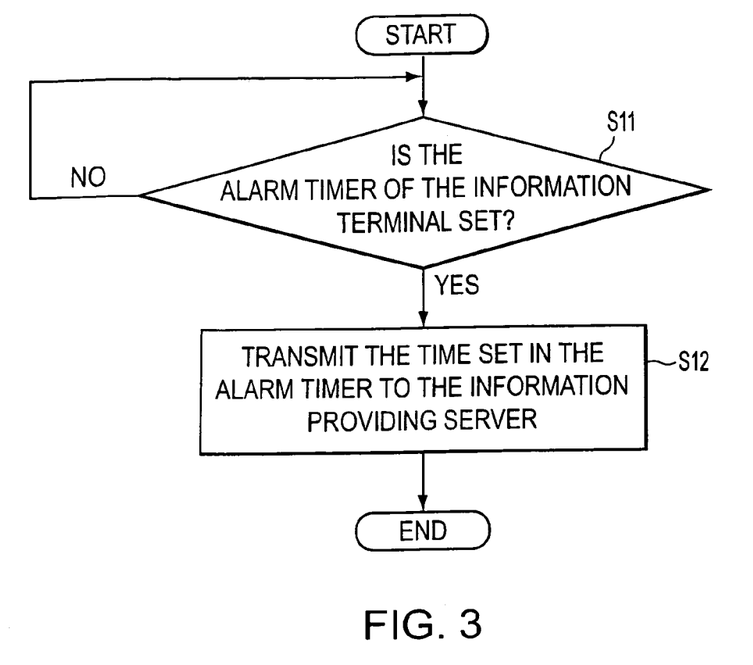
FIG. 3 is a second flow chart showing a process of uploading life information according to an exemplary embodiment of the invention.
Figure 4:
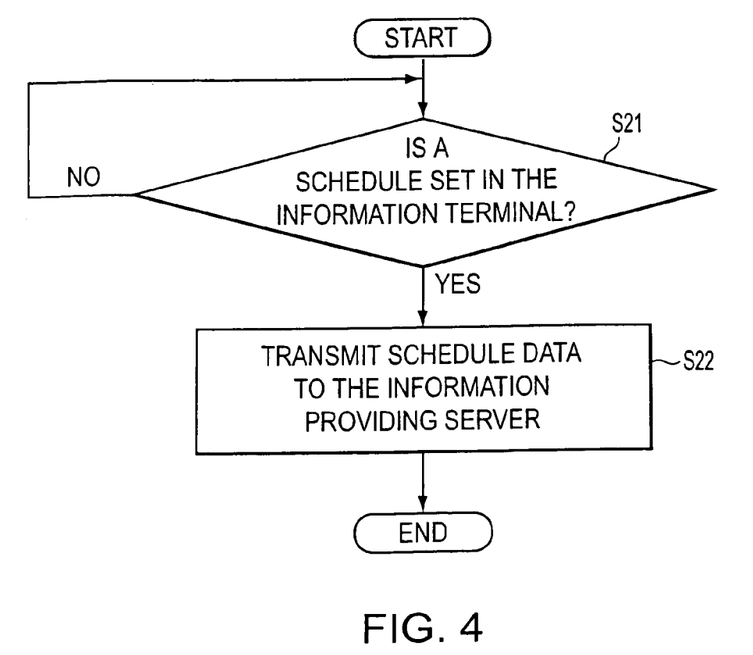
FIG. 4 is a third flow chart showing a process of uploading life information according to an exemplary embodiment of the invention.

The operation of the exemplary navigation system constructed in the above-described manner is described below. First, the process of uploading life information of the user to, for example, the information providing server 11 is described with reference to FIGS. 2-4. FIG. 2 is a first flow chart showing a process of uploading life information according to an exemplary embodiment of the invention. FIG. 3 is a second flow chart showing a process of uploading life information according to an exemplary embodiment of the invention. FIG. 4 is a third flow chart showing a process of uploading life information according to an exemplary embodiment of the invention.

According to the present exemplary embodiment, if the navigation apparatus 31 or the information terminal 32 is capable of uploading life information of the user to the information providing server 11, the information providing server 11 accumulates that life information. When a certain amount of life information has been accumulated, the information providing server 11 can extract life patterns from the accumulated life information and can register the extracted life patterns as life pattern information. In accordance with the registered life pattern information, the information providing server 11 can, for example, transmit predicted congestion information, route information, route guidance information, and/or the like to the navigation apparatus 31. Thus, information that is relevant to the user's daily routine is downloaded into the navigation apparatus 31 and stored therein. An exemplary operation of uploading life information associated with the user to the information providing server 11 is described in further detail below. The life information may be of any type as long as it can be used to produce, for example, predicted congestion information, route information, or route navigation information. Examples of such life information include (i) information associated with daily life relating to driving of the vehicle, and (ii) information associated with a non-daily schedule relating to driving of the vehicle.

Specifically, life information of type (i) can include, for example, driving data associated with commuting to and from a place of work or a school, driving data associated with driving to take a passenger to and from a main station to assist the passenger to commute to and from a place of work or a school, and/or driving data associated with driving to go for shopping, eating, exercising, and/or entertainment. Note that the driving data may include date/time information indicating the date, the day of week, the time, and/or the time period of driving. The life information of type (i) can also include information relating to the date/time of driving. For example, the time a user wakes up can have a close relationship with the start time of driving to a place of work or a school or to take a passenger to a main station to assist the passenger to commute to and from a place of work or a school. Thus, the waking time may be included in the life information of type (i). For example, it is possible to assume that the start time of driving to a place of work may be, for example, close to one hour after the user wakes up.

For example, other specific examples of life information of type (ii) may include, for example, information about a schedule on a holiday associated with drive, travel, shopping, eating, sports, entertainments, etc., and can also include information about a schedule associated with a business trip, meeting with a customer, etc. Note that schedule information can include, for example, driving information such as information indicating a destination and can also include date/time information such as information indicating a scheduled start time or a predicted arrival time.

An exemplary process of uploading driving data of life information of type (i) to the information providing server 11 is described below with reference to FIG. 2. In this operation, the navigation apparatus 31 automatically records driving data and transmits the recorded driving data to the information providing server 11 via the access point. First, the navigation apparatus 31 determines whether the switch of the engine of the vehicle is turned on (step S1). If it is determined that the switch of the engine has been turned on (step S1=YES), the navigation apparatus 31 starts to record driving data in an internal storage device (step S2). The driving data may include, for example, data indicating the current position of the vehicle, the pressure on the accelerator, the motion of the brake pedal, the steering angle, the vehicle speed, and/or the date/time information relating to the driving. The navigation apparatus 31 continues recording the driving data until the engine switch of the vehicle is turned off (step S3).

If the navigation apparatus 31 determines that the engine switch of the vehicle has been turned off (step S3=YES), the navigation apparatus further determines whether the vehicle is parked within an area in which communication with the access point is possible (step S4), that is, whether the vehicle is located within the communication area of the user's network. For example, the vehicle may be parked at the user's parking place, the parking place is located within the area in which communication with the user's access point is possible, and thus the wireless LAN device of the navigation apparatus 31 can communication with the access point via the wireless LAN system. However, for example, when the vehicle is parked at a place other than the user's parking place, such as a parking lot of a company where the user works, the vehicle may be located outside the communication area in which communication with the access point is possible, and thus the wireless LAN device of the navigation apparatus 31 cannot communicate with the access point.

If the navigation apparatus 31 determines that the vehicle is located within the area in which communication with the access point is possible (step S4=YES), the navigation apparatus 31 transmits driving data stored in the internal storage device to the access point via the wireless LAN system (step S5). For example, the access point may transfer the driving data received from the navigation apparatus 31 to the information providing server 11 via a network such as the Internet. Note that, according to this example, the ID key identifying the navigation apparatus 31 is also transmitted together with the driving data to the information providing server 11. Thus, the driving data is uploaded from the navigation apparatus 31 to the information providing server 11. After completion of transmitting the driving data, the operation of the navigation apparatus 31 is stopped (step S6), that is, the navigation apparatus 31 is turned off. Thus, the process of uploading the driving data is completed.

If the navigation apparatus 31 determines that the vehicle is located outside the area in which communication with the access point is possible (step S4=NO), the navigation apparatus 31 ends the process without transmitting the driving data. In this case, the current driving data can be retained and additional driving data will be accumulated until the vehicle is parked within an area in which communication with the access point is possible. Then all of the accumulated driving data can be transmitted to the information providing server 11.

An exemplary process of uploading information indicating a user's wake-up time as date/time information relating to the driving that can be included in life information of type (i), to the information providing server 11 is described below with reference to FIG. 3. For the purpose of this example, it is assumed that a portable telephone is used as the information terminal 32, and that the user sets the alarm timer of the portable telephone in order to wake up in the morning. If an alarm time is set in the alarm timer of the portable telephone serving as the information terminal 32, the information terminal 32 automatically transmits the alarm time as the wake-up time to the information providing server 11.

Specifically, the information terminal 32 determines whether an alarm time is set in the alarm timer (step S11). If the alarm time is set (step S11=YES), the information terminal 32 transmits data indicating the alarm time to the information providing server 11 (step S12). Note that according to this example the ID key identifying the information terminal 32 is also transmitted together with the data indicating the alarm time to the information providing server 11. Thus, the data indicating the time of getting up may be uploaded from the information terminal 32 to the information providing server 11. After completion of transmitting the time of waking up, the information terminal 32 ends the process. Because the information terminal 32 is capable of communicating with the information providing server 11 without using the access point, it is not necessary to determine whether the information terminal 32 is located within an area in which communication with the access point is possible.

An exemplary process of uploading schedule information of life information of type (i) to the information providing server 11 is described below with reference to FIG. 4. For the purpose of this example, it is assumed that a PDA device is used as the information terminal 32, and the user sets his/her schedule in the PDA device using a scheduler provided by personal information management (PIM) software. If a schedule is set in the PDA serving as the information terminal 32, the information terminal 32 automatically transmits information indicating, for example, a destination and a start time, set in the schedule, to the information providing server 11.

Specifically, the information terminal 32 determines whether a schedule has been set in a scheduler of the information terminal 32 (step S21). If the information terminal 32 determines that a schedule has been set (step S21=YES), the information terminal 32 transmits information associated with a destination and a start time set in the schedule to the information providing server 11 (step S22). Note that the ID key identifying the information terminal 32 may also be transmitted together with the information associated with the schedule to the information providing server 11. Thus, the information associated with the schedule may be uploaded from the information terminal 32 to the information providing server 11. After completion of transmitting the information associated with the schedule, the information terminal 32 ends the process.

Because the information terminal 32 is capable of communicating with the information providing server 11 without using the access point, it is not necessary to determine whether the information terminal 32 is located within an area in which communication with the access point is possible. If the access point is, for example, a home server having a scheduler or a personal computer having a scheduler is connected to the access point via a wireless LAN system, the information associated with any of those schedulers may be uploaded from the home server or the personal computer to the information providing server 11.

Figure 5:
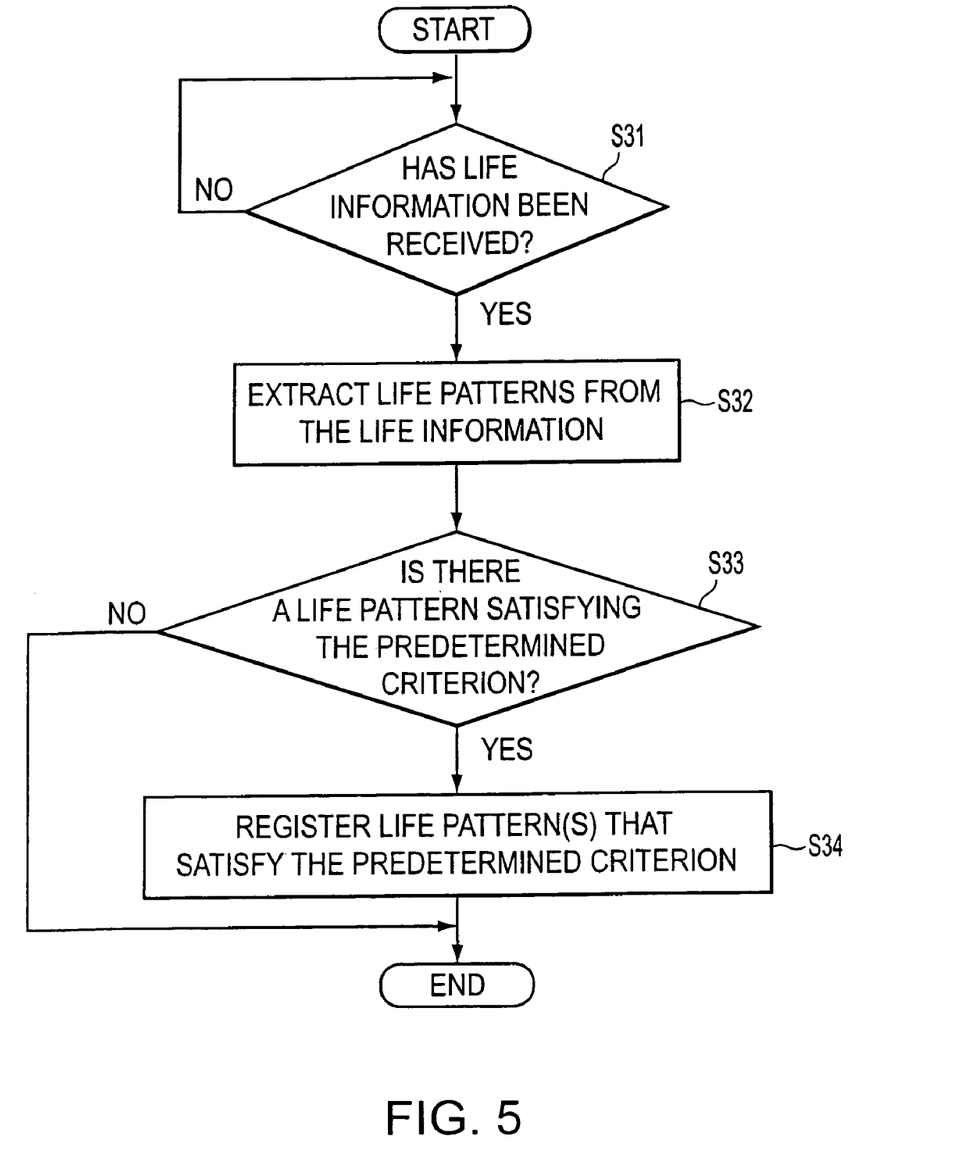
FIG. 5 is a flow chart showing a process of extracting a life pattern from life information and registering the extracted life pattern according to an exemplary embodiment of the invention.

Now, the process performed by the information providing server 11 to extract a life pattern from the uploaded life information is described with reference to the FIG. 5. FIG. 5 is a flow chart showing a process of extracting a life pattern from life information and registering the extracted life pattern according to an embodiment of the present invention.

First, the information providing server 11 waits for life information to be uploaded from the navigation apparatus 31 or the information terminal 32 (step S31). If the information providing server 11 determines that life information has been received (step S31=YES), the information providing server 11 extracts a life pattern by, for example, performing statistical processing on the received life information (step S32). Life information is treated separately for each user. For example, if the received life information includes driving data and waking-up time data, the information providing server 11 may extract from the waking-up time and the driving start time a pattern indicating that the vehicle starts to drive after a particular time period since the waking-up time. If the information providing server 11 determines that the vehicle tends to start to drive after an elapse of, for example, around one hour since the waking-up time, the information providing server 11 determines that there is a life pattern that the vehicle tends to start to drive after an hour after the waking-up time. On the basis of that waking-up time data, the information providing server 11 can collect traffic information associated with a time period including the start time of the vehicle, and the information providing server 11 can produce predicted congestion information on the basis of the collected traffic information. Accordingly, the information providing server 11 can transmit the predicted congestion information to the navigation apparatus 31 at a proper time before the start time at which the vehicle starts to drive.

If the received life information includes schedule data, the information providing server 11 can detect the destination and the start time from that schedule data, and the information providing server 11 can collect traffic information associated with a geographical area including the destination and associated with a time range including the start time. Furthermore, the information providing server 11 can produce predicted congestion information on the basis of the collected traffic information.

The information providing server 11 determines whether life patterns extracted from the given life information satisfy a predetermined criterion (step S33). An example of the criterion is whether the ratio of the number of the same life patterns to the total number of life patterns extracted from the life information is greater than a predetermined value. For example, when there are a total of n life patterns extracted from the life information, if the number of the same life patterns is equal to or greater than $n \times \alpha$ (where $\alpha$ is a threshold value predetermined in the range of $0 < \alpha < 1$), it is determined that the life information has a pattern satisfying the criterion.

If a life pattern satisfying the above-described criterion is detected (step S33=YES), the information providing server 11 registers the detected life pattern in the life pattern memory 14 (step S44). The registration of life patterns is performed separately for each user. In the case in which no life pattern satisfying the criterion is detected, the information providing server 11 discards the extracted patterns without registering them.

Figure 6:
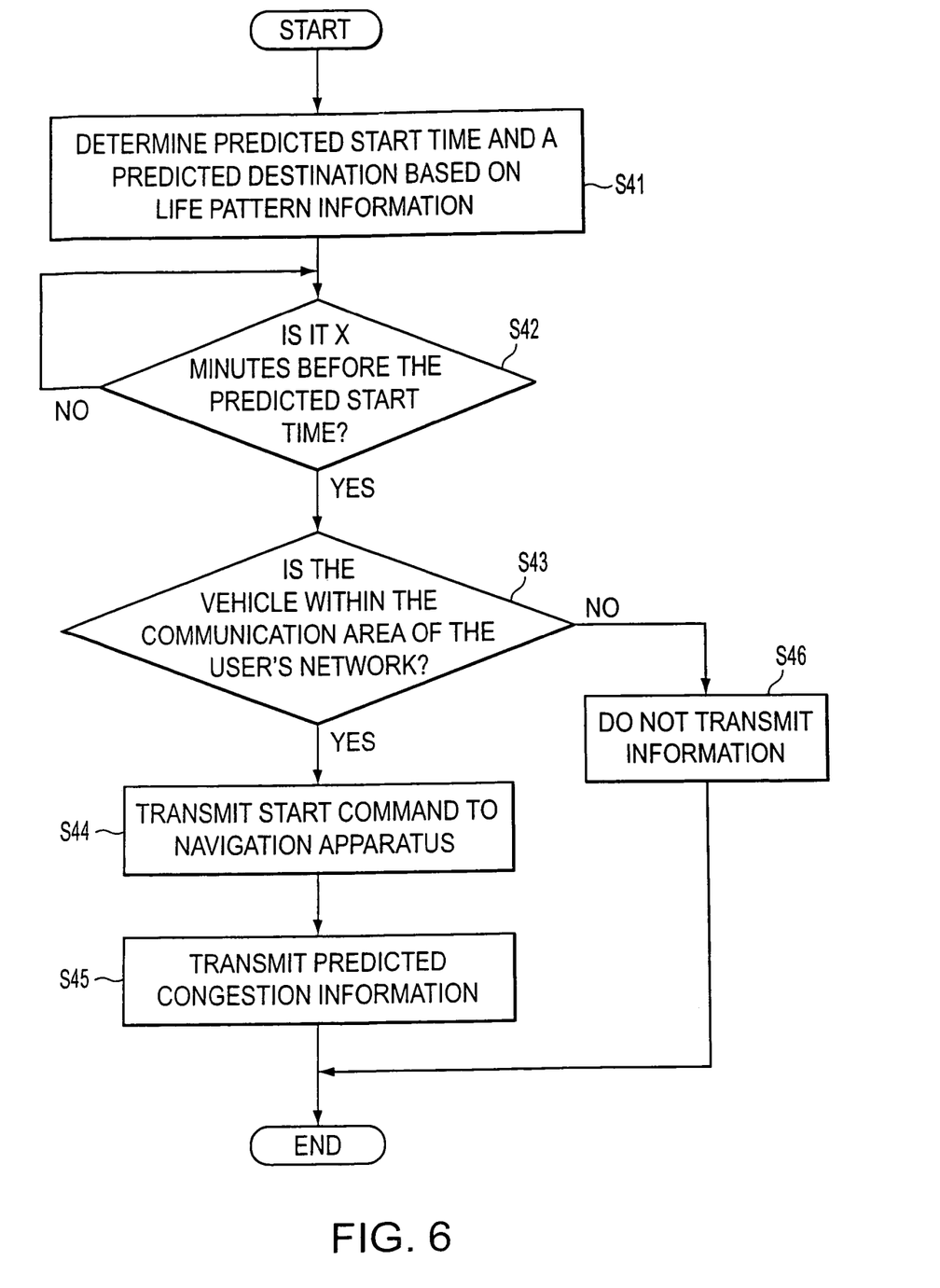
FIG. 6 is a flow chart showing a process of generating predicted congestion information and transmitting the generated information according to an exemplary embodiment of the invention.

The operation performed by the information providing server 11 to produce predicted congestion information and transmit the predicted congestion information to the navigation apparatus 31 is described with reference to FIG. 6. FIG. 6 is a flow chart showing the process of generating predicted congestion information and transmitting the generated information according to an embodiment of the present invention.

The information providing server 11 determines the predicted start time and destination on the basis of the registered life pattern for a particular user (step S41). If the life information is schedule information, the start time and the destination set in the schedule may be employed as the predicted start time and destination. If the life information is driving data and wake-up time data, the predicted start time may be determined to be equal to a particular time (for example, one hour) after the wake-up time, and the destination may be, for example, a place of work, a school, or the like. The information providing server 11 collects traffic information associated with a geographical area including the destination and associated with a time period including the predicted start time, and produces predicted congestion information that indicates congestion predicted to occur in the geographical area including the destination in the time period including the predicted start time.

For example, when the predicted start time is 7 a.m., and the destination is a place of work, the information providing server 11 produces predicted congestion information indicating congestion predicted to occur at about 7 a.m. in an area including the place of work. Additionally, a predicted arrival time may be used instead of the predicted start time, and a start point may be used instead of the destination. According to various exemplary embodiments, both the predicted start time and the predicted arrival time may be used, and both the destination and the start point may be used. When the information providing server 11 has a route search unit, it is desirable that the information providing server 11 search for a route from the start point to the destination to detect a recommended route that needs a shortest driving time.

Returning to the example, the information providing server 11 then determines whether it is X minutes before the predicted start time (step S42). X may be set, in advance, to a particular value taking into account, for example, the time needed to transmit predicted congestion information to the navigation apparatus 31 and also taking into account the time needed for the navigation apparatus 31 to receive the predicted congestion information. If it is determined that it is X minutes before the predicted start time (step S42=YES), the information providing server 11 determines whether the vehicle of the user is parked within an area in which communication with the access point is possible, that is, whether the vehicle is located within the communication area of the network of the user (step S43). Specifically, the information providing server 11 may transmit an inquiry message to the access point, and check a response to the inquiry message by the access point to determine whether the vehicle is located within the communication area of the network of the user.

If it is determined that the vehicle of the user is parked within an area in which communication with the access point is possible (step S43=YES), the information providing server 11 transmits a start command or signal to the navigation apparatus 31 via the access point (step S44). In response to the start command, the navigation apparatus 31 is turned on, and thus it becomes possible for the navigation apparatus 31 to receive data. The information providing server 11 transmits the predicted congestion information to the navigation apparatus 31 via the access point (step S45) and ends the process. In the above process, it may be desirable to also transmit route information indicating a recommended route together with the predicted congestion information to the navigation apparatus 31. If it is determined that the vehicle of the user is not parked within an area in which communication with the access point is possible (step S43=NO), the start signal or the predicted congestion information is not transmitted to the navigation apparatus 31 (step S46). In this case, the information providing server 11 immediately ends the process.

Figure 7:
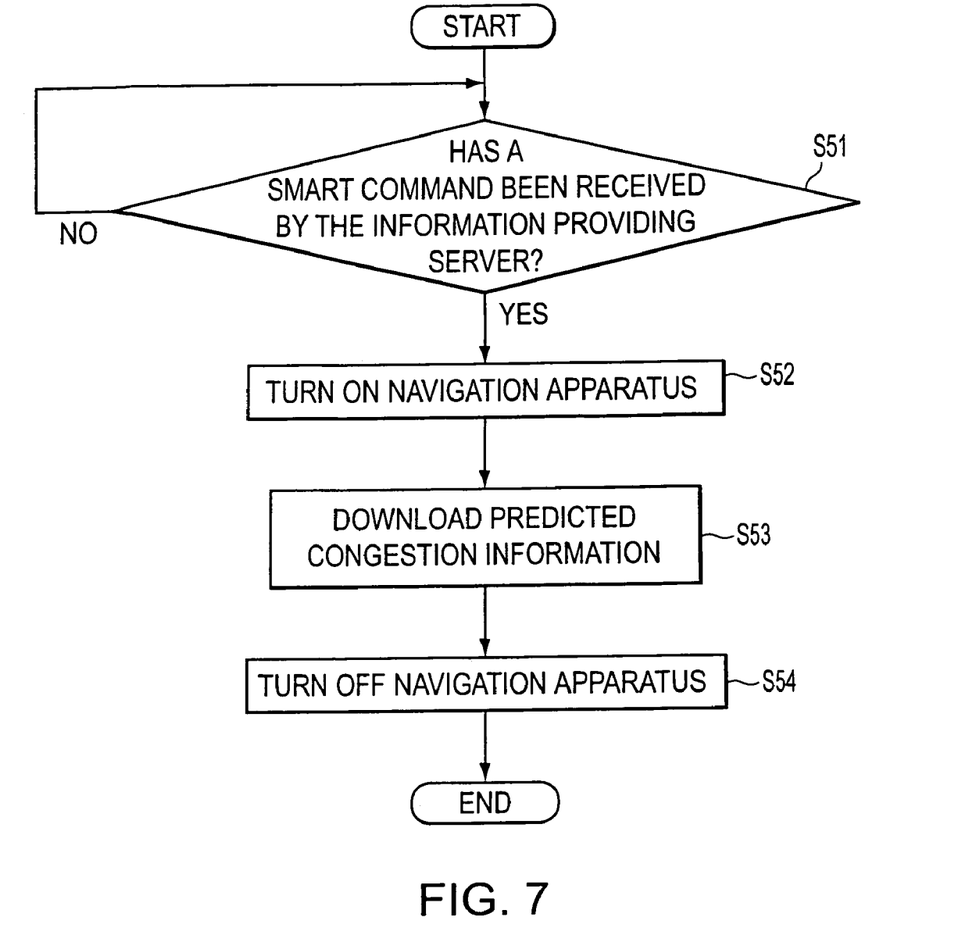
FIG. 7 is a flow chart showing a process of receiving predicted congestion information according to an exemplary embodiment of the invention.
Figure 8:
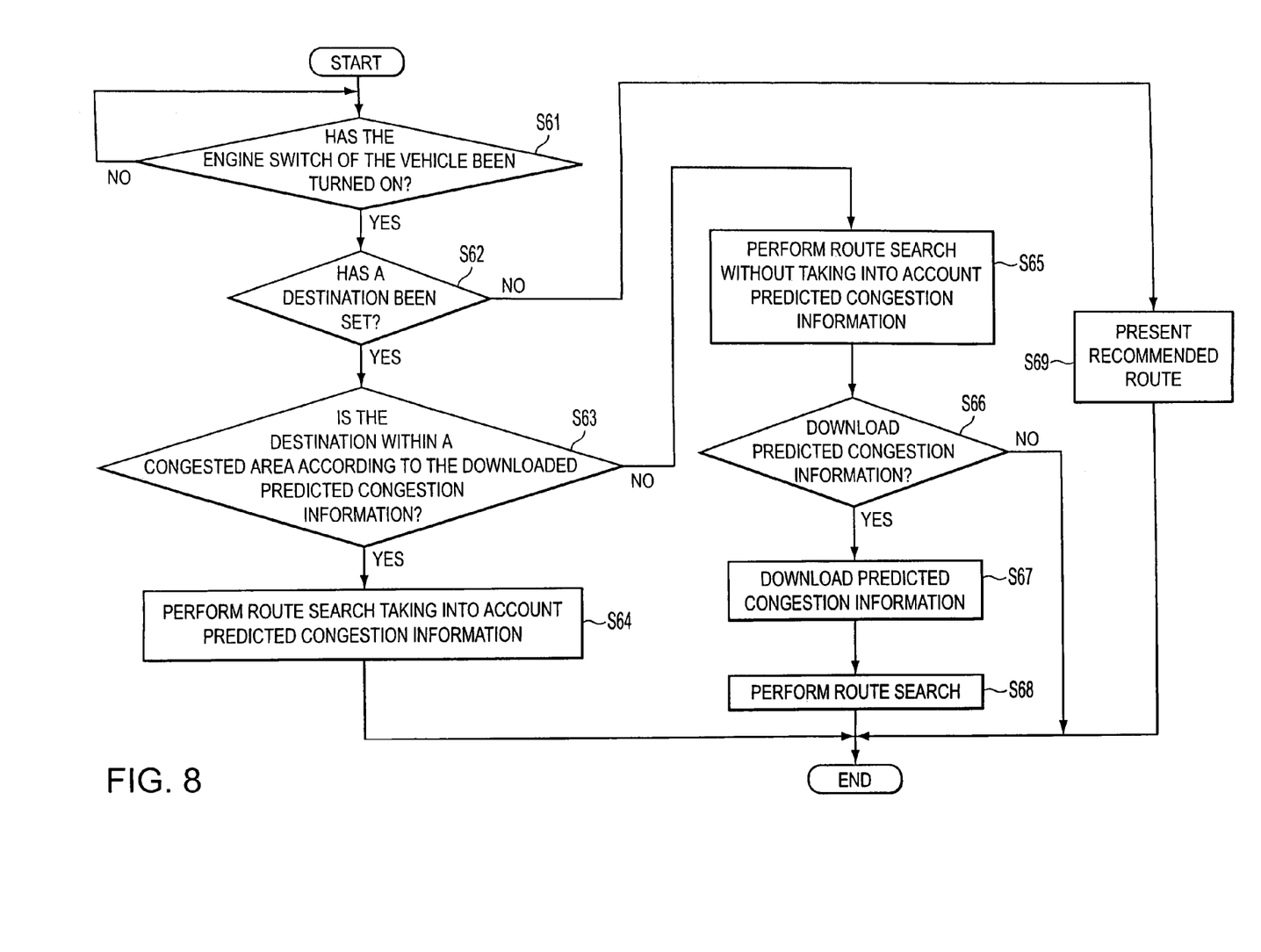
FIG. 8 is a flow chart showing a process of using predicted congestion information according to an exemplary embodiment of the invention.

The operation performed by the navigation apparatus 31 to receive predicted congestion information from the information providing server 11 and use the received information is described below with reference to FIGS. 7 and 8. FIG. 7 is a flow chart showing a process of receiving predicted congestion information according to an embodiment of the present invention. FIG. 8 is a flow chart showing a process of using predicted congestion information according to an embodiment of the present invention.

For the purpose of this example, it is assumed that the vehicle is in a state in which the vehicle has not started to drive and the engine switch and the accessory switch of the vehicle are both off. In such a state, the predicted congestion information is received from the information providing server 11 as follows. As described earlier, electric power is supplied to the navigation apparatus 31 from the vehicle battery serving as the main power supply. The vehicle has an accessory signal generator that generates an accessory signal when the accessory switch is turned on. When the accessory signal is received, as with common vehicle navigation apparatuses, the navigation apparatus 31 is turned on and electric power is supplied to all parts thereof. The navigation apparatus 31 according to the present exemplary embodiment of the invention is also turned on when the wireless LAN device serving as the transmitting/receiving unit receives a start signal from the outside, even if the accessory switch is off.

First, it is determined whether the navigation apparatus 31 has received a start signal transmitted from the information providing server 11 via the access point (step S51). If the navigation apparatus 31 determines that the information providing server 11 has issued the start command (step S51=YES), the navigation apparatus 31 starts operation. That is, the navigation apparatus 31 is turned on (step S52), and the navigation apparatus 31 becomes capable of receiving data. In this state, if the information providing server 11 transmits predicted congestion information, the navigation apparatus 31 receives the predicted congestion information via the access point and stores the received information in the storage means. Thus, the predicted congestion information is downloaded into the navigation apparatus 31 (step S53). It may be desirable to also download route information indicating a recommended route together with the predicted congestion information. If the downloading of the predicted congestion information is completed, the navigation apparatus 31 stops the operation. That is, the navigation apparatus 31 is turned off (step S54), and the process is ended.

Thereafter, the downloaded predicted congestion information is used as follows. First, the navigation apparatus 31 determines whether the engine switch of the vehicle has been turned on (step S61). If it is determined that the engine switch has been turned on (step S61=YES), the navigation apparatus 31 further determines whether a destination has been set (step S62). If a destination is set (step S62=YES), the navigation apparatus 31 determines whether the location of the destination is within the geographical area (e.g., up to and including the starting point) that is predicted, by the downloaded predicted congestion information, to have congestion (step S63). If the location of the destination is within the geographical area indicated as congested by the downloaded predicted congestion information (step S63=YES), the navigation apparatus 31 searches for a route that, for example, needs a shortest driving time, taking into account the downloaded predicted congestion information (step S64). After completion of searching for the route, the navigation apparatus 31 ends the above-described process performed taking into account the predicted congestion information.

If the destination is not within the geographical area indicated by the predicted congestion information (step S63=NO), the navigation apparatus 31 searches for a route without taking into account the downloaded predicted congestion information (step S65). After a route is detected, the navigation apparatus 31 prompts the user to determine whether to download predicted congestion information from the information providing server 11 (step S66). Specifically, for example, a message asking the user to determine whether to download predicted congestion information from the information providing server 11 is displayed together with a selection button for selecting whether to download the information on the display of the navigation apparatus 31. If the navigation apparatus 31 has a voice output device such as a loudspeaker, the above-described message may be output via a voice.

If the user selects to download predicted congestion information from the information providing server 11 (step S66=YES), the navigation apparatus 31 transmits a request signal for predicted congestion information to the information providing server 11. Note that the request signal includes information indicating the destination. In response to receiving the request signal, the information providing server 11 generates predicted congestion information associated with, for example, a geographical area including the destination and associated with a time range including the current time, and transmits the generated predicted congestion information to the navigation apparatus 31. On receiving the predicted congestion information (step S67), the navigation apparatus 31 again performs searching to detect a route that needs a shortest driving time, taking into account the received predicted congestion information (step S68). When the request signal is transmitted or when the predicted congestion information is downloaded, if the vehicle goes out of the area in which communication with the access point is possible, communication between the navigation apparatus 31 and the information providing server 11 may be performed via a device having a mobile data communication capability such as a portable telephone or a PHS telephone connected to the navigation apparatus 31.

If no destination is set (step S62=NO), the navigation apparatus 31 displays a recommended route on the display in accordance with downloaded recommended route information (step S69), in addition to the predicted congestion information. That is, recommended route is automatically presented to the user. This allows the user to get a route to the destination without setting the destination in the navigation apparatus 31.

According to the present exemplary embodiment, as described above, life information associated with the user may be uploaded to the information providing server 11 from the navigation apparatus 31 or the information terminal 32 in advance. The information providing server 11 can register life pattern information extracted from the life information and can determine the predicted start time of the vehicle and the predicted destination on the basis of the life pattern information. Furthermore, the information providing server 11 can produce predicted congestion information associated with, for example, a geographical area including the destination and associated with a time range including the predicted start time. The information providing server 11 can transmit the predicted congestion information to the navigation apparatus 31 before the predicted start time of the vehicle. Because, in the above-described manner, the predicted congestion information is downloaded to the navigation apparatus 31 in advance the user can use the predicted congestion information immediately after the navigation apparatus 31 is turned on.

The information providing server 11 may search for a route from the start point to the destination to detect a recommended route that needs, for example, a shortest driving time. If the route information indicating the recommended route is downloaded to the navigation apparatus 31, the user can easily get a route to the destination without setting the destination in the navigation apparatus 31. Note that uploading of life information to the information providing server 11 may also be automatically performed by the navigation apparatus 31 or the information terminal 32, and thus the user does not need to operate the navigation apparatus 31 or the information terminal 32.

Also note that because life information, predicted congestion information, and/or recommended route information may be transmitted between the information provider server 11 and the navigation apparatus 31 using the wireless LAN system via an access point, communication cost is low even when a large amount of data is transmitted.

As described above, various exemplary embodiments of the invention allow a user of a navigation system to use predicted traffic information substantially immediately after a user turns on the navigation device.

While various features of this invention have been described in conjunction with the exemplary embodiments outlined above, various alternatives, modifications, variations, and/or improvements of those features may be possible. Accordingly, the exemplary embodiments of the invention, as set forth above, are intended to be illustrative. Various changes may be made without departing from the spirit and scope of the invention.

What is claimed is:

1. A navigation system comprising:
   a controller that:
      collects life information associated with a user;
      extracts a life pattern from the collected life information;
      registers the extracted life pattern as life pattern information; and
      determines a predicted start time and a predicted destination based on the life pattern information;
      generates predicted traffic information associated with a geographical area including the destination and associated with a time range including the predicted start time.

2. The navigation system of claim 1, wherein the controller:
   transmits a start signal to a navigation apparatus before the predicted start time thereby causing the navigation apparatus to be started; and
   transmits, after the navigation apparatus is started, the predicted traffic information to the navigation apparatus.

3. The navigation system of claim 1, wherein the controller:
   searches for a route to the destination based on the predicted traffic information, wherein information associated with the route detected by the search is transmitted to the navigation apparatus before the predicted start time.

4. The navigation system of claim 1, wherein the life information is information associated with daily life and related to driving a vehicle or information associated with a schedule and related to driving the vehicle.

5. The navigation system of claim 4, wherein the information associated with daily life and related to driving the vehicle is driving data of the vehicle or data indicating the schedule of a user.

6. The navigation system of claim 5, wherein the data indicating the schedule of the user includes the time at which the user wakes up.

7. The navigation system of claim 1, wherein the geographical area includes a predicted starting point.

8. The navigation system of claim 1, wherein the controller extracts the life pattern by statistically processing the collected life information.

9. The navigation system of claim 1, wherein the life information associated with the user is collected from an information terminal.

10. An information server including the navigation system of claim 1.

11. A method for providing information comprising:
    collecting life information associated with a user;
    extracting a life pattern from the collected life information;
    registering the extracted life pattern as life pattern information;
    determining a predicted start time and a predicted destination based on the life pattern information; and
    generating predicted traffic information associated with a geographical area including the destination and associated with a time range including the predicted start time.

12. The method of claim 11, further comprising:
    transmitting a start signal to a navigation apparatus before the predicted start time thereby causing the navigation apparatus to be started; and
    transmitting, after the navigation apparatus is started, the predicted traffic information to the navigation apparatus.

13. The method of claim 11, further comprising:
    searching for a route to the destination based on the predicted traffic information; and
    transmitting information associated with the route detected by the search to the navigation apparatus before the predicted start time.

14. The method of claim 11, wherein the life information is information associated with daily life and related to driving a vehicle or information associated with a schedule and related to driving the vehicle.

15. The method of claim 14, wherein the information associated with daily life and related to driving the vehicle is driving data of the vehicle or data indicating the schedule of a user.

16. The method of claim 15, wherein the data indicating the schedule of the user includes the time at which the user wakes up.

17. The method of claim 11, wherein the geographical area includes a predicted starting point.

18. The method of claim 11, wherein extracting the life pattern from the collected life information comprises statistically processing the collected life information.

19. A navigation system comprising:
    means for collecting life information associated with a user;
    means for extracting a life pattern from the collected life information;
    means for registering the extracted life pattern as life pattern information;
    means for determining a predicted start time and a predicted destination based on the life pattern information; and
    means for generating predicted traffic information associated with a geographical area including the destination and associated with a time range including the predicted start time.

* * * * *